United States Patent Office

2,857,442
Patented Oct. 21, 1958

2,857,442

AROMATIZATION PROCESS AND CATALYST THEREFOR

Russell G. Hay, Fox Chapel, Pa., assignor to Gulf Research & Development Company, Pittsburgh, Pa., a corporation of Delaware No Drawing. Application November 12, 1954
Serial No. 468,549

14 Claims. (Cl. 260—673.5)

This invention relates to a process for the dehydrogenation of hydrocarbons and more particularly to a novel catalyst and process for the aromatization of non-aromatic hydrocarbons.

Among the processes for the conversion of hydrocarbons, and particularly hydrocarbons derived from petroleum, to produce products of increased value are those dehydrogenation processes in which the hydrocarbons are converted to products having a lower hydrogen to carbon ratio. An example of a dehydrogenation process is the conversion of paraffinic hydrocarbons to olefinic hydrocarbons by splitting hydrogen from the paraffins. The conversion is generally accomplished by passing the hydrocarbons to be converted over suitable catalysts at elevated temperatures, usually in the range of 750° to 1200° F. In aromatization processes, the reaction products have a still lower hydrogen to carbon ratio than olefins, and in addition, it is usually necessary to close a ring of carbon atoms to form the aromatic compounds, depending, of course, upon the charge stock employed. Aromatization processes, like other dehydrogenation processes, usually reside in the step of passing a suitable charge stock over a catalyst at an elevated temperature; however, because of the more extensive and difficult conversion required in aromatization processes, catalysts suitable for dehydrogenation of hydrocarbons to form olefins are not always satisfactory for use in aromatization processes.

Some of the most widely used catalysts for the aromatization of hydrocarbons are gels of chromium oxide. These gels may be prepared by careful precipitation from solutions of chromium nitrate with a base, for example, sodium or potassium hydroxide. Another method of preparing chromium oxide in gel form for use as a catalyst is by carefully heating ammonium chromate or ammonium dichromate to decomposition temperatures in a manner to avoid glowing. Chromium oxide gels supported on alumina are especially active and selective catalysts for aromatization of hydrocarbons. Supported catalysts of alumina-chromia may be prepared by impregnation of alumina with chromium nitrate followed by carefully heating to decompose the chromium nitrate. Another method of preparing catalysts of chromium oxide gels supported on alumina is by co-precipitation of the oxides of aluminum and chromium from a solution of salts of aluminum and chromium, for example, a solution of aluminum sulphate and chromium nitrate, by careful neutralization with ammonium hydroxide.

Active chromium oxide gel catalysts of high selectivity are difficult to prepare by the processes heretofore available. They require either the carefully controlled heating of comparatively expensive chromium salts or the precipitation of chromium oxide by careful neutralization of chromium salts. In spite of extreme care in the preparation of the catalysts, the chromium oxide gel catalysts vary in activity, and often the chromium oxide remaining on the catalyst is in an inactive form.

This invention resides in a process for the preparation of a novel catalyst for the aromatization of non-aromatic hydrocarbons by the impregnation of an alumina support with the chromate or dichromate of sodium or potassium and the hydroxide of sodium or potassium. This invention further resides in a process for the aromatization of non-aromatic hydrocarbons employing the novel catalyst.

The alumina support which is impregnated with sodium or potassium chromate or dichromate according to this invention is a conventional adsorbent alumina. The adsorbent alumina is ordinarily prepared by calcination of a hydrated form of alumina such as alumina trihydrate. Adsorbent alumina suiatble for use as supports for the catalysts of this invention is manufactured by several companies and is available as an ordinary commercial product. The preferred alumina supports are stabilized by small amounts, in the range of up to about 7.5 percent, of silica. Stabilized alumina can be prepared, for example, by co-precipitation from solutions of aluminum and silicon salts followed by drying and calcination. A suitable alumina stabilized with silica is manufactured by the Harshaw Chemical Company and sold as Harshaw H–42. Adsorbent alumina substantially free of silica is also satisfactory for use in the preparation of aromatization catalysts according to this invention.

Prior to impregnation with the sodium or potassium chromate or dichromate, the support is preferably dried in an oven and then calcined at approximately 1000° F. for a period of about 16 hours. The calcination tends to fix the characteristics of the alumina and overcome variations in its properties resulting from the conditions to which the alumina is exposed subsequent to its manufacture and prior to the impregnation. The calcined alumina support is impregnated by bringing it into contact with a solution of sodium or potassium chromate or dichromate. The concentration of the impregnating solution may range from as low as 1 or 2 percent up to a substantially saturated solution. It is preferred to use alkali metal chromate solutions containing 10 to 60 percent alkali metal chromate. The volume of the impregnating solution may range from just enough to cover the support to as much as twenty-five or more times the volume of the support. The time of contact between the support and the impregnating solution may range from a few minutes to one or more days. The important consideration in determining the concentration and volume of the impregnating solution, as well as the time of contact, is the amount of the chromate that is to be deposited on the support. The concentration of the chromate, calculated as chromium, in the impregnated support ranges from 1 to 20 percent of the total weight of the support, on a dry basis, and is preferably within the range of 2 to 10 percent of the weight of the dried catalyst.

The catalysts prepared according to this invention are characterized by an alkali metal content substantially higher than the catalysts of the prior art. The concentration of the alkali metal in the catalyst is higher than the stoichiometric equivalent of the chromate or dichromate and ranges from approximately one-half the concentration of the chromium to approximately three times the concentration of the chromium. The concentration of alkali metal in the catalyst is approximately 0.5 to 15 percent.

The impregnation of the almina support with the chromate or dichromate of sodium or potassium may be accomplished by any of the usual techniques employed for bringing a solid material into contact with an impregnating solution. The support can be immersed in the impregnating solution, with or without agitation, for a period sufficient to deposit the desired amount of the chromate on the support. Another method of impregnating the supoprt is to circulate the impregnating solution over the support. Impregnation of the support with the alkali metal chromate is speeded by first evacuating the support to remove adsorbed moisture and air from the pores and then covering the support with the impregnating solution while still under vacuum, followed by an increase in the pressure to atmospheric or higher pressures.

Following the impregnation of the support with the chromate solution, the composite is dried at a low temperature of 200° to 350° F. In a preferred process for the prepartion of a catalyst by this invention, the composite after drying at the low temperature is impregnated with a solution of sodium or potassium hydroxide. The impregnation with the hydroxide of the alkali metal can be accomplished by any of the impregnation techniques described above. The hydroxide solution may range in concentration from about 0.1 to 15 percent of the hydroxide and preferably from 1 to 5 percent. Concentrations of the alkali metal hydroxide solution above about 10 percent tend to remove excessive amounts of chromate from the support. Treatment of the catalyst with solutions of alkali metal hydroxides can also be accomplished simultaneously with the impregnation with the alkali metal chromate by the addition of sodium or potassium hydroxide to the chromate solution, for example, in quantities to adjust the pH of the impregnating solution to approximately 10. It is preferred, however, to add the alkali metal hydroxide to the catalyst subsequent to the impregnation with the chromate solution in order that the amount of alkali metal hydroxide introduced into the composite may be controlled completely independently of the concentration of the chromate.

The dried composite of alumina and alkali metal chromate can be used directly in the aromatization process. It is preferred, however, to stabilize the catalyst after the low temperature drying by heating to approximately the temperature at which the aromatization reaction takes place, for example, a temperature of 100° F. The catalyst is not sensitive to the conditions under which it is heated to the calcination temperature and can be heated in the presence of air or an inert gas. Further stabilization of the catalyst may be accomplished by calcining at 1000° F. in an atmosphere of hydrogen to simulate in part the atmosphere existing in the aromatization process.

The catalyst employed in the aromatization reaction can be in the form of granules, beads, pellets or a finely divided material suitable for use in fluidized processes. Contact between the hydrocarbon charge stock and the catalyst is obtained by any of the well known methods for obtaining contact between a solid catalyst and a gaseous reaction stream such as fixed bed, fluid bed or moving bed processes. If a fluid bed process is employed, it can be either a fixed fluid bed in which the catalyst particles remain in a single reaction vessel and are subjected alternately to aromatization and regeneration conditions, or the more usual fluid bed process in which the catalyst is continually transferred between a reaction vessel and a regenerator.

The novel catalyst prepared according to this invention can be employed in the aromatization of normal and branched paraffins and olefins of at least six carbon atoms. The catalysts are also effective for the aromatization of naphthenes having six or more carbon atoms in the naphthene ring. Naphthenes such as methyl cyclopentane having rings of five carbon atoms produce excessive amounts of coke in the aromatization reaction and preferably are removed from the charge stock. The charge stock can be substantially pure streams for the preparation of specific aromatic compounds. Examples are the aromatization of normal hexane or a fraction comprising a mixture of hydrocarbons of six carbon atoms to produce benzene, or the aromatization of heptane to produce toluene. A charge stock for the aromatization reaction can also consist of mixtures of hydrocarbons having hydrogen to carbon ratios higher than those of aromatic compounds, such as hydrocarbons boiling in the gasoline range to produce a mixture of different aromatic hydrocarbons.

The aromatization is accomplished by passing the charge stock over the catalyst at a temperature of 900° to 1100° F., and preferably 950° to 1050° F. The pressure at which the aromatization reaction is carried out should be low since higher pressures reduce the yield of aromatic compounds. Substantially atmospheric pressures, for example, pressures below about 10 p. s. i. gauge are desirable. A low effective pressure may be obtained by the addition of diluents such as hydrogen to the reactant stream.

The charge stock is passed through the reactor at a liquid hourly space velocity in the range of 0.1 to 10 volumes of charge stock/volume of catalyst/hour and preferably in the range of 0.5–2.5 volumes of charge stock/volume of catalyst/hour. Higher selectivities are obtained at space velocities in the upper portion of the range; however, the lower conversions obtained at the higher space velocities result in a low yield of aromatics. The high space velocities can be employed in a process in which unconverted, non-aromatic hydrocarbons are separated from the aromatic reaction products and recycled through the reactor to improve the yield of aromatic hydrocarbons.

Coke is produced during the aromatization reaction and is deposited on the catalyst thereby causing gradual reduction in the activity of the catalyst. Regeneration of the catalyst is obtained in the usual manner by oxidation of the carbonaceous deposits by passing an oxygen-containing gas, usually air, in contact with the catalyst at a temperature sufficiently high to cause ignition of the deposits. A temperature in the range of 900° to 1200° F. is employed for regeneration of the catalyst.

The following examples illustrate the preparation of aromatization catalysts according to this invention:

EXAMPLE I 181.2 grams (250 cc.) of adsorbent alumina containing 5.6 percent silica (Harshaw H–42) were dried in an oven and calcined at 1000° F. for sixteen hours. The calcined alumina was evacuated and then covered with 200 cc. of a 43.2 percent aqueous potassium chromate solution and the pressure increased to atmospheric pressure. After the solution had contacted the alumina base for a total of twenty minutes, the solution was drained from the composite and the composite dried overnight at 265° F. The dried composite was impregnated with 250 cc. of a 12.4 percent potassium hydroxide solution. The potassium hydroxide solution was drained from the catalyst and the catalyst was dried overnight at 220° F. The catalyst prepared according to this example contained 3.3 percent chromium and 10.3 percent potassium.

EXAMPLE II 183.6 cc. of Harshaw H–42 alumina containing 5.6 percent silica were oven dried and calcined at 1000° F. for a period of sixteen hours. The calcined alumina was evacuated and then covered with 250 cc. of 52.6 percent aqueous sodium chromate solution. The pressure was increased to atmospheric pressure and the sodium chromate solution maintained in contact with the alumina base for 20 minutes. The solution was drained from the base and the impregnated alumina dried for 16 hours at 257° F. The dried composite was then evacuated and impregnated with 250 cc. of a 7.5 percent sodium hydroxide solution for 20 minutes after which the sodium hydroxide solution was drained from the catalyst and the catalyst dried 16 hours at 257° F. The resulting catalyst contained 6.85 percent chromium and 5.33 percent sodium.

EXAMPLE III 120 cc. of an adsorbent alumina substantially free of silica (Harshaw XF-21) were evacuated and then covered with about 120 cc. of a 37.8 percent aqueous potassium chromate solution. The pressure was increased to atmospheric pressure and the solution maintained in contact with the alumina base for a period of 20 minutes. The solution was then drained from the base and the impregnated alumina dried at 257° F. for a period of 16 hours. The resulting catalyst contained 4.5 percent chromium and 5.9 percent potassium.

The catalysts prepared according to each of Examples I, II and III were calcined at 1000° F. for a period of 3 hours and then were subjected to a reduction by an atmosphere of hydrogen at a temperature of 1000° F. for 3 hours. Normal hexane was then passed over a fixed bed of each of the catalysts at atmospheric pressure and at a liquid hourly space velocity of approximately one volume/volume/hour in the presence of hydrogen introduced at the rate of 1500 cubic feet per barrel of hexane. Flow of hexane over the catalysts was continued for a throughput of 4 volumes of hexane per volume of catalyst.

EXAMPLE IV

Following the aromatization run, the catalyst of Example I was regenerated by passing air over the catalyst at a temperature of 1000° F. until there was no additional liberation of heat. The regenerated catalyst was reduced in an atmosphere of hydrogen for a period of three hours at 1000° F. Following the reduction, n-hexane was passed over the catalyst at the same space velocity and under the conditions described above for the catalyst of Examples I, II and III. The results of the aromatization of hexane are set forth in Table I.

Table I

| Catalyst of Example No. | I | II | III | IV |
|---|---|---|---|---|
| Aromatization Temp. | 1,020 | 1,025 | 1,020 | 1,020 |
| Products: | | | | |
| Dry Gas, percent | 11.9 | 8.2 | 7.6 | 11.9 |
| Liquid, percent | 80.5 | 88.8 | 92.3 | 84.8 |
| Coke, percent | 2.0 | 1.6 | 1.4 | 1.9 |
| Loss, percent | 5.6 | 1.4 | 0 | 1.4 |
| Selectivity, percent | 60 | 56 | 50 | 68 |
| Conversion, percent | 50 | 36 | 26 | 52 |
| Benzene yield, percent | 29 | 19 | 13 | 32 |
| Olefin yield, percent | 8 | 9 | 6 | 9 |

The data set forth in Table I show that catalysts prepared by the impregnation of adsorbent aluminas with sodium or potassium chromate are effective catalysts for the aromatization of paraffins, and specifically for the manufacture of benzene from n-hexane. In general, the aromatization of n-hexane to form benzene is more difficult than the aromatization of longer chain paraffins, such as heptane, or the aromatization of olefins or naphthenes of 6 carbon atoms. Charge stocks other than hexane, for example, charge stocks of the types described earlier in this specification are also effectively converted to aromatic hydrocarbons by this invention.

What I claim is:

1. A process for the preparation of a catalyst for the dehydrogenation of hydrocarbons comprising impregnating an adsorbent alumina support with a solution of a compound selected from the group consisting of chromates and dichromates of sodium and potassium in amounts to form a catalyst containing 1 to 20% chromium, said solution containing 0.1 to 15% of the hydroxide of the alkali metal in the chromium-containing compound used in the impregnation to give the impregnating solution a pH of about 10, and drying the thus impregnated support.

2. A process for the preparation of a catalyst for the dehydrogenation of hydrocarbons comprising impregnating an alumina support with an aqueous solution of a compound selected from the group consisting of the chromates and dichromates of sodium and potassium in amounts to form a catalyst containing 1 to 20% chromium, drying the thus impregnated support to form a composite, impregnating the composite with a 0.1 to 15% aqueous solution of a hydroxide of a metal selected from the group consisting of sodium and potassium, and drying the thus impregnated composite.

3. A process for the preparation of a catalyst for the dehydrogenation of hydrocarbons comprising impregnating an alumina support with an aqueous solution of potassium chromate in amounts to form a catalyst containing 1 to 20% chromium, drying the impregnated support to form a composite of alumina and potassium chromate, impregnating the composite with a 0.1 to 15% solution of potassium hydroxide, draining potassium hydroxide from the composite, and drying the composite subsequent to the draining.

4. A process for the preparation of a catalyst for the dehydrogenation of hydrocarbons comprising impregnating an alumina support with an aqueous solution of sodium chromate in amounts to form a catalyst containing 1 to 20% chromium, drying the impregnated support to form a composite of alumina and sodium chromate, impregnating the composite with a 0.1 to 15% solution of sodium hydroxide, draining sodium hydroxide from the composite and drying the composite subsequent to the draining.

5. A process for the preparation of a catalyst for the dehydrogenation of hydrocarbons comprising impregnating an adsorbent alumina support with an aqueous solution containing about 10 to 60 percent of a compound selected from the group consisting of chromates and dichromates of sodium and potassium, drying the impregnated support to form a composite, impregnating the composite with an aqueous solution containing 1 to 5 percent of a hydroxide of a metal selected from the group consisting of sodium and potassium, and drying the thus impregnated composite.

6. A process for the preparation of a catalyst comprising impregnating an alumina support with a solution of a compound selected from the group consisting of the chromates and dichromates of sodium and potassium in amounts to form a catalyst containing 1 to 20% chromium, drying the impregnated support to form a composite, impregnating the composite with a 0.1 to 15% solution of a hydroxide of a metal selected from the group consisting of sodium and potassium, drying the impregnated composite, and calcining the dried impregnated composite at a temperature in the range of 900°–1200° F.

7. A process for the preparation of a catalyst comprising impregnating an alumina support with a solution of a compound selected from the group consisting of the chromates and dichromates of sodium and potassium in amounts to form a catalyst containing 1 to 20% chromium, drying the impregnated support to form a composite, impregnating the composite with a 0.1 to 15% solution of a hydroxide of a metal selected from the group consisting of sodium and potassium, drying the impregnated composite, calcining the dried impregnated composite at a temperature in the range of 900°–1200° F., and stabilizing the calcined composite in an atmosphere of hydrogen at a temperature in the range of 900°–1200° F.

8. A process for the preparation of a dehydrogenation catalyst comprising impregnating an alumina support with a solution of a compound selected from the group consisting of chromates and dichromates of sodium and potassium, drying the impregnated support to form a composite, impregnating the composite with a solution of a 0.1 to 15% hydroxide of an alkali metal selected from the group consisting of sodium and potassium, and drying and calcining the impregnated composite to form a catalyst, the amount and concentrations of the impregnating solutions being adjusted to form a catalyst containing 1–20 percent chromium and about 0.5–15 percent of the alkali metal.

9. A process for the dehydrogenation of hydrocarbons comprising passing a hydrocarbon charge stock containing compounds selected from the group consisting of paraffins, olefins, naphthenes and mixtures thereof at a temperature in the range of 900°–1100° F. in contact with a catalyst prepared by impregnating an adsorbent alumina support with a compound selected from the group consisting of the chromates and dichromates of sodium and potassium, drying the impregnated support to form a composite, impregnating the dried composite with a 0.1 to 15% solution of a hydroxide of an alkali metal selected from the group consisting of potassium and sodium and calcining the impregnated composite at a temperature in the range of 900°–1200° F.

10. A process for the aromatization of paraffin hydrocarbons containing at least 6 carbon atoms per molecule comprising passing the hydrocarbons at a temperature in the range of 900°–1100° F. in contact with a catalyst prepared by impregnating an adsorbent alumina support with a compound selected from the group consisting of chromates and dichromates of sodium and potassium in amounts to form a catalyst containing 1 to 20% chromium, drying the impregnated support to form a composite, impregnating the dried composite with a 0.1 to 15% solution of a hydroxide of a metal selected from the group consisting of sodium and potassium, and drying and calcining the impregnated composite.

11. A process for the dehydrogenation of hydrocarbons selected from the group consisting of paraffins, olefins, naphthenes and mixtures thereof comprising passing the hydrocarbons at a temperature of 900°–1100° F. in contact with a catalyst prepared by impregnating an alumina support with a compound selected from the group consisting of chromates and dichromates of sodium and potassium in amounts to form a catalyst containing 1 to 20% chromium, drying the impregnated support to form a composite, impregnating the composite with a 0.1 to 15% solution of a hydroxide of a metal selected from the group consisting of sodium and potassium and drying the impregnated composite, the concentration and volume of the solution for impregnating the support and the time of contact of the solution with the support being adjusted to form a catalyst containing 1–20 percent chromium on a dry basis.

12. A process as set forth in claim 9 in which the solution for impregnating the support is an aqueous solution of potassium chromate and the solution for impregnating the composite is an aqueous solution of potassium hydroxide.

13. A process as set forth in claim 9 in which the solution for the impregnating of the support is an aqueous solution of sodium chromate and the solution for impregnating the composite is an aqueous solution of sodium hydroxide.

14. A process for the preparation of a catalyst for the dehydrogenation of hydrocarbons comprising impregnating an alumina support with an aqueous solution of a compound selected from the group consisting of the chromates and dichromates of sodium and potassium, draining excess aqueous impregnating solution from the support to leave a composite of an alumina support containing 1 to 20% chromium, impregnating the composite with a 1.0 to 15% aqueous solution of a hydroxide of a metal selected from the group consisting of sodium and potassium, and drying the thus impregnated composite.

References Cited in the file of this patent
UNITED STATES PATENTS

| | | |
|---|---|---|
| 2,172,534 | Grosse | Sept. 12, 1939 |
| 2,331,292 | Archibald et al. | Oct. 12, 1943 |
| 2,337,191 | Greensfelder et al. | Dec. 21, 1943 |
| 2,691,647 | Field et al. | Oct. 12, 1954 |

UNITED STATES PATENT OFFICE
CERTIFICATE OF CORRECTION

Patent No. 2,857,442                                                                 October 21, 1958

Russell G. Hay

It is hereby certified that error appears in the printed specification of the above numbered patent requiring correction and that the said Letters Patent should read as corrected below.

Column 3, line 39, for "$100°$ F." read -- $1000°$ F. --; column 6, lines 70 and 71, for "a solution of a 0.1 to 15% hydroxide" read -- a 0.1 to 15% solution of a hydroxide --; column 8, line 28, for "1.0" read -- 0.1 --.

Signed and sealed this 6th day of January 1959.

(SEAL)
Attest:

KARL H. AXLINE                                                  ROBERT C. WATSON
Attesting Officer                                           Commissioner of Patents